United States Patent

Watson et al.

[11] 4,093,049
[45] June 6, 1978

[54] FREEWHEEL DEVICES

[75] Inventors: Kenneth Watson, Yeovil; James Edwin Saunders, Sherborne, both of England

[73] Assignee: Westland Aircraft Limited, Yeovil, England

[21] Appl. No.: 765,119

[22] Filed: Feb. 3, 1977

[30] Foreign Application Priority Data

Feb. 3, 1976 United Kingdom .................. 4252/76

[51] Int. Cl.² ............................................. F16D 41/00
[52] U.S. Cl. ..................................... 192/47; 192/93 C
[58] Field of Search .................. 192/32, 38, 41 R, 42, 192/44, 45, 45.1, 47, 93 C

[56] References Cited

U.S. PATENT DOCUMENTS

| 1,931,316 | 10/1933 | Fishburn | 192/47 X |
| 2,051,385 | 8/1936 | Murray | 192/44 X |
| 2,076,635 | 4/1937 | Halstead | 92/47 X |

*Primary Examiner*—Roy Lake
*Assistant Examiner*—E. F. Desmond
*Attorney, Agent, or Firm*—Larson, Taylor and Hinds

[57] ABSTRACT

This invention relates to freewheels comprising a plurality of rollers interposed between inner and outer races formed on driving and driven members respectively, one of said races having a plurality of wedge-shaped portions equal in number to the number of rollers. The invention is particularly concerned with cageless freewheels of this construction, and discloses a means for moving said rollers between a first position in which the rollers assume an engaged position to transmit rotation to the driven member, and a second position in which the rollers are retained in a disengaged position. This is accomplished by at least one actuating lever interposed in the rollers, and being capable of limited circumferential movement between said first and second positions. In one embodiment the actuating lever has parallel side portions for engagement with adjacent rollers, and in a second embodiment the actuating lever includes a circular section spindle portion rotatably mounted in an axial bore in one of the rollers.

16 Claims, 5 Drawing Figures

FREEWHEEL DEVICES

This invention relates to freewheels comprising a plurality of rollers interposed between inner and outer races formed respectively on a pair of driving and driven members, one of the races being smooth and the other having a plurality of wedge-shaped portions equal in number to the number of the rollers so that initial relative rotation of the driving and driven members in the driving direction causes wedging of the rollers between the races in an engaged position, whereas relative rotation of the members in the opposite direction causes the rollers to move down the wedge-shaped portions into a disengaged position. The invention is concerned with cageless freewheels of this construction.

In contrast to caged freewheels of this construction, in which each roller is supported in spaced relationship between the races by a cage means, it is a feature of the cageless design that the rollers are unsupported in this manner so that a full complement of rollers can be incorporated, resulting in a device having a greater number of rollers and, thus, load-carrying capacity, than that possible in a cage design of similar size. This increased load-carrying capability is one important advantage of the cageless design in that, for a given load, a smaller diameter freewheel can be utilized than would be possible if a caged design were used. Other advantages include increased reliability owing to omission of a cage susceptible to wear and to breakage, and a corresponding reduction in maintenance requirements and cost.

An example of such a cageless freewheel is disclosed in U.S. Pat. No. 3,103,998.

One of the disadvantages of the cageless freewheel is that it has hitherto not been possible to utilize such a design in an installation requiring an actuatable freewheel equivalent in function to the caged freewheel configuration having an extension of its cage that is used to enable the rollers to be positively positioned relative to the wedge-shaped portions and maintained in either an engaged or a disengaged position.

It is an object of the present invention to provide a cageless freewheel capable of actuation between engaged and disengaged positions.

Accordingly the invention provides a cageless freewheel comprising a plurality of rollers interposed between inner and outer races formed respectively on a pair of driving and driven members, one of said races having wedge-shaped portions equal in number to the rollers, at least one axially extending actuating lever being interposed in the plurality of rollers and being arranged for limited circumferential movement between a first position in which the rollers assume an engaged position on rotation of the driving member so as to transmit rotation to the driven member, and a second position in which the rollers are retained in a disengaged position, and means for moving the or each lever between said first and second positions.

In one embodiment of the invention the or each actuating lever has parallel sides for engagement with adjacent rollers. In such an embodiment it is preferred that the width of the lever(s) is substantially equal to the diameter of the rollers.

In another form of the invention the or each actuating lever has a circular section spindle portion rotatably mounted in an axial bore in one of the said rollers.

Means may be provided to limit circumferential movement of the or each actuating lever to a predetermined amount. Conveniently, said means may comprise a tongue provided on the or each lever for location in a slot formed in the member having the wedge-shaped race, the slot being of greater width than the width of the tongue so as to permit circumferential movement of the lever(s) and to limit such movement to the predetermined amount.

The means for moving the or each actuating lever may include an axial extension formed at one end of the lever and arranged for co-operation, during operation, with an operating means.

In an embodiment having two or more actuating levers, the extensions on the respective levers may be interconnected so as to permit simultaneous movement of the levers. The interconnection may be by means of a ring which may be formed integral with the levers, and an outer edge of the ring may be provided with at least one cam surface arranged to co-operate, during operation, with an operating means for effecting circumferential movement of the levers. For instance, for each cam surface the operating means may include an axially movable prong having a suitably shaped surface for co-operation with the cam surface of the ring.

The or each said prong may be mounted on a housing located on axial splines on an extension of the wedge-shaped race-provided member of the freewheel so as to rotate with the freewheel and be capable of axial movements relative thereto.

A bearing may be supported on the housing and may be arranged to support a stationary housing having two diametrically opposed pins extending generally radially therefrom. The pins may be engaged in the slotted ends of a semi-circular lever arranged to straddle the stationary housing, the lever being connected to an actuator arranged to swing the lever about a fixed axis located perpendicular to an axis of the freewheel so as to move the slotted ends of the lever axially with respect to the freewheel.

The actuator may be electrically operated.

The invention will now be described by way of example only and with reference to the accompanying drawings, in which FIG. 1 is an end elevation of a cageless freewheel according to one embodiment of the invention;

Figure 1:
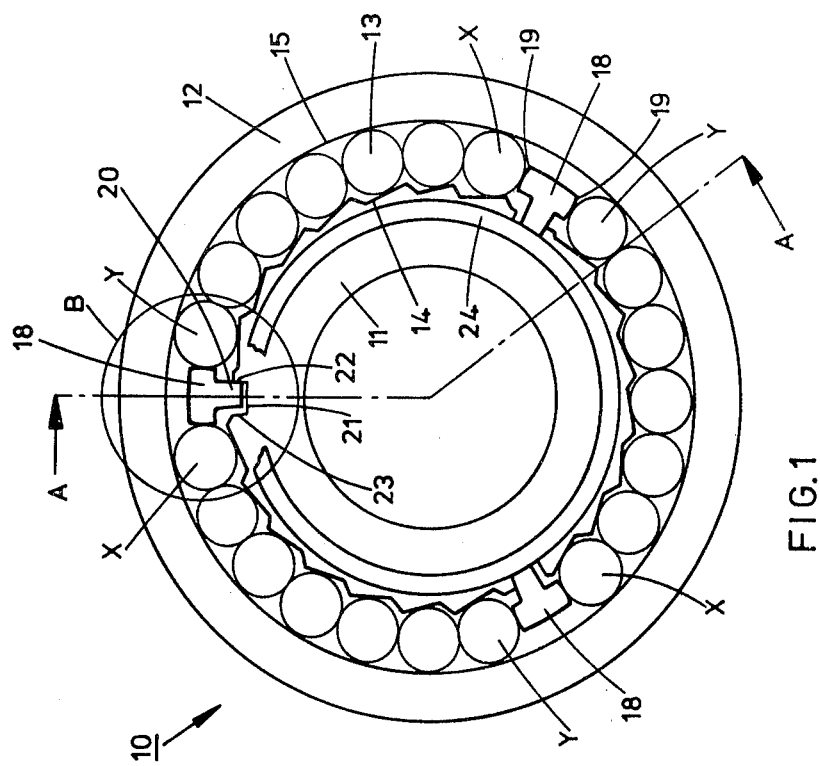
Figure 3:
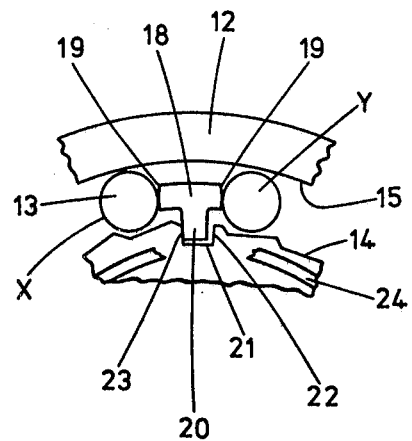
FIG. 3 is a fragmentary sectioned view of the part of FIG. 1 within circle B.
Figure 2:
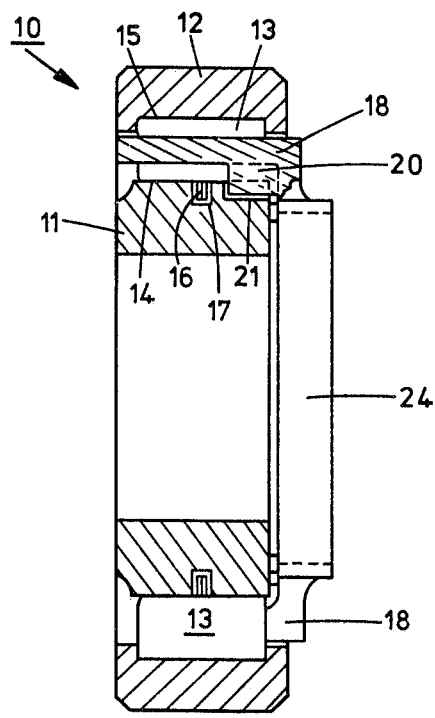
FIG. 2 is a sectioned view taken on arrows A—A of FIG. 1.

The cageless freewheel generally indicated at 10 in FIGS. 1 to 3 includes an inner driving member 11 and an outer driven member 12. The driving and driven members, 11 and 12 respectively, are maintained in co-axial relationship by a plurality of rollers 13 located between an inner race 14 formed around the outside diameter of the driving member 11, and an outer race 15 formed on the inside diameter of the driven member 12.

As best shown in FIG. 1, the inner race 14 comprises a plurality of wedge-shaped portions and the outer race 15 is smooth. A diametrically expandable spring 16 is housed in a circumferential groove 17 formed around the periphery of the driving member 11 so as to contact the rollers 13.

Three axially extending actuating levers 18 are interposed in the race of rollers 13 and are equi-spaced therearound. Each lever 18 has parallel side portions 19 arranged at a width dimension corresponding to the diameter of the rollers 13, and is located so that each side portion 19 contacts its adjacent roller 13 at approximately the pitch circle diameter of the set of rollers 13.

A radially inwardly extending tongue 20 is provided at one end of each lever 18, the tongues 20 being located in an equal number of slots 21 formed in the periphery of the driving member 11. The slots 21 are of a width between opposed edges 22 and 23 respectively (FIGS. 1 and 3) of slightly greater dimension than the width of the tongues 20 so as to permit small circumferential movements of each lever 18 through a predetermined arc of movement defined by the width of the slots 21.

The tongued end of each lever 18 protrudes from the races 14 and 15, and is formed integral with a ring 24, thereby interconnecting the three levers 18, and providing a means of connecting the levers 18 to an operating mechanism (not shown) arranged to selectively move the levers 18 through their predetermined arc of movement. The portion of the ring 24 adjacent the uppermost lever 18 has been omitted in FIGS. 1 and 3, in order to clarify the illustration.

The spring 16 tends to urge the rollers 13 radially outwardly so that, when the ring 24 is unloaded and the driving member is rotated counterclockwise, the rollers 13 are moved up the wedge-shaped portions of the inner race 14 into an engaged position (FIG. 1) in which the rollers 13 are locked between the inner and outer races 14 and 15 respectively, so that drive will be transmitted through the rollers 13 to rotate the driven member 12.

When it is required to disengage the drive, the ring 24 is moved counterclockwise by the operating mechanism (not shown), relatively to the driving member 11, thereby causing each lever 18 to be moved through its predetermined arc of movement until the tongue 20 contacts edge 23 of its associated slot 21, as shown in FIG. 3. This movement of the levers 18 urges the rollers 13 down the wedge-shaped portions of the inner race 14 into a disengaged position in which the driving member 11 can be rotated independently of the driven member 12.

Although three actuating levers 18 are provided in the particular embodiment hereinbefore described, it will be understood that one lever 18 is the minimum requirement. An important factor in deciding the number of levers 18 required in a particular embodiment is that, in the disengaged position, it is desirable that all the rollers 13 remain clear of the shoulders of the adjacent wedge-shaped portions of the inner race 14 (as shown in FIG. 3), thereby preventing rubbing and wear.

Clearly, the amount of permitted circumferential movement of the lever(s) 18 is important in this respect; other design criteria to be considered are the number of rollers 13, the clearance between each roller 13 and the corresponding bunch clearance of a gang of rollers 13. Thus, in each of the three gangs of rollers 13 shown in FIGS. 1 and 3, it is necessary for the roller X that is shifted by the adjacent lever 18 to be moved through a distance sufficient to ensure that the roller Y is moved to a disengaged position, this distance being at least equal the bunch clearance of the gang of seven rollers 13, without bringing the roller X into contact with the shoulder of the adjacent wedge-shaped portion.

The width of levers 18 is approximately equal to the diameter of the rollers 13. This is because the wedge-shaped portions are of generated construction so that it is convenient to utilize one standard sloped surface for installation of each actuating lever 18.

It will be apparent that, in the embodiment of FIGS. 1, 2 and 3, the number of levers 18 will reduce the number of rollers 13 by a similar amount. However, since a full complement of rollers 13 can be installed between each pair of levers 18, significantly more rollers 13 can be incorporated for a given size than in a caged freewheel in which each roller is separated from its neighbour by a portion of the cage. Thus, this embodiment exhibits the advantages of a cageless device in an actuatable freewheel.

Figure 5:
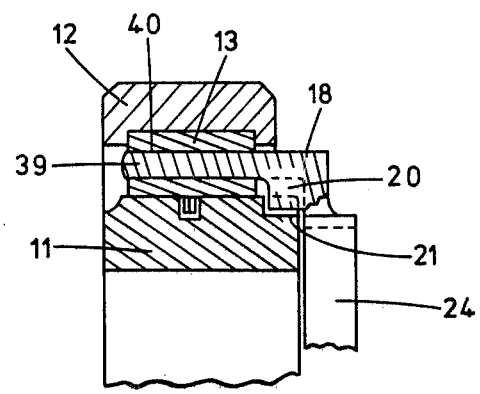
FIG. 5 is a fragmentary sectioned view similar to part of FIG. 2 and illustrating a further embodiment.

In the modification shown in FIG. 5, the arrangement is such that a cageless freewheel with a full complement of rollers is provided with a facility to actuate the freewheel between engaged and disengaged positions. In this modification the or each actuating lever 18 has a circular section spindle 39 rotationally mounted in a bore 40 provided in a roller 13. Moreover, the tongue 20 on the lever 18 and the associated slot 21 in the driving member 11 is located externally of the inner race 14 so that the latter may retain a wedge-shaped portion at the site of the lever 18, whereby the roller 13 associated with the lever 18 can participate in transmitting torque. Alternatively, the roller 13 associated with the lever 18 could be shorter than the other rollers, so that a tongue and slot arrangement similar to that described in relation to the embodiment of FIGS. 1, 2 and 3 could be retained in the modification of FIG. 5.

The driving and driven members 11 and 12 respectively can be provided with any desired means of connection between a power source and an output. For example, gear teeth, keyways, splines or V-belt grooves, may be provided. Similarly, the ring 24 may be provided with means, for example, cam surfaces or internal angled slots, to facilitate connection to suitable opening means.

Figure 4:
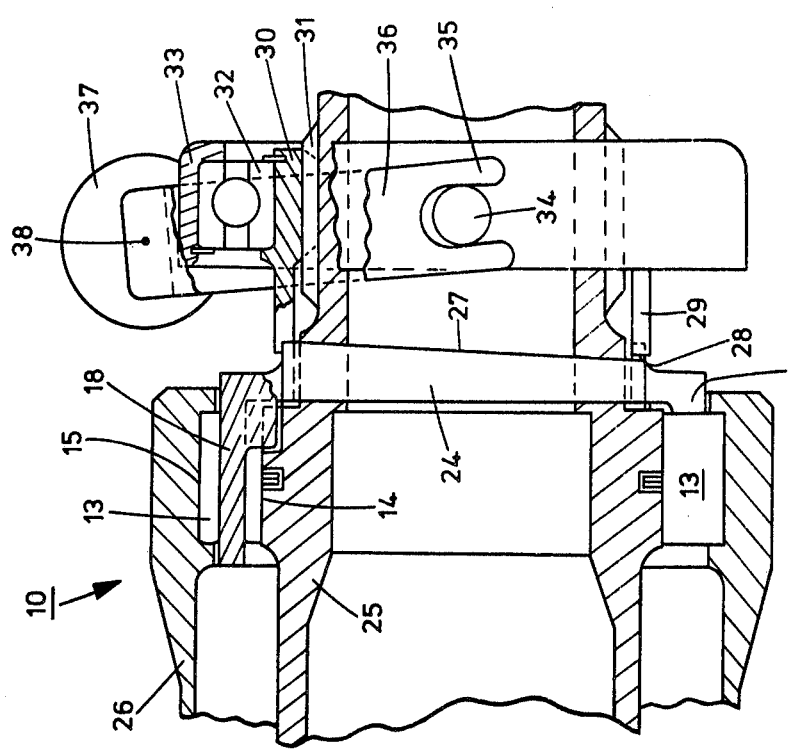
FIG. 4 is a fragmentary sectioned side elevation of a cageless freewheel similar to that of FIGS. 1, 2 and 3, and illustrating one means for actuating the device.

FIG. 4 illustrates one manner of incorporating a freewheel according to the invention in an operational environment, and shows one suitable mechanism for actuating the freewheel between its engaged and disengaged positions.

In this arrangement the driving and driven members comprise coaxial hollow shafts 25 and 26 respectively. The inner wedge-shaped race 14 is formed around the periphery of the inner driving shaft 25 and the outer race 15 is formed on the inside diameter of the outer driven shaft 26. The arrangement of three actuating levers 18 is similar to that previously described in relation to the embodiment of FIGS. 1, 2 and 3.

An outer edge 27 of the ring 24 is provided with two diametrically opposed camming surfaces 28. The camming surfaces 28 are contacted by suitably shaped ends of two prongs 29 extending axially inwardly from an inner housing 30 mounted on axial splines 31 formed on an outer diameter of an extension of the shaft 25, so as to be capable of axial movements relative the freewheel 10.

The inner housing 30 supports a ball bearing 32 which in turn supports an outer housing 33 having two diametrically opposed pins 34 extending radially therefrom. The pins 34 are engaged by slotted ends 35 of a semi-circular arm 36 arranged to straddle the outer housing 33. The arm 36 is connected to an electrically operated actuator 37 arranged to swing the slotted ends 35 of the arm 36 about a horizontal axis 38 located perpendicular to the freewheel axis.

Rotation of the driving shaft 25 causes rotation of the levers 18 and the ring 24, and also rotation of the prongs 29 extending from the inner housing 30. The outer housing 33 remains stationary due to the provision of the bearing 32.

When the ring 24 is unloaded, that is with the prongs 29 in a retracted position rotation of the driving shaft 25 causes the rollers 13 to move up the wedge-shaped portions into an engaged position, and each lever 18 is positioned with its tongue 20 contacting edge 22 of slot 21 (see FIG. 1), thereby causing rotation of the driven shaft 26.

When it is desired to disengage the drive, the actuator 37 is operated to swing the forked end 35 of the lever 36 towards the freewheel 10 about the axis 38. This movement is transmitted through the pins 34 to the stationary outer housing 33, and through the bearing 32 to the rotating inner housing 30. The inner housing 30 is moved axially on the splines 31 towards the freewheel 10 so that the shaped ends of the prongs 29 co-operate with the camming surfaces 28 on the ring 24 to rotate the ring 24. This causes the levers 18 to be moved to the position shown in FIG. 3, so that the rollers 13 are moved to a disengaged position, as hereinbefore explained.

Other suitable means of operating the levers 18 may be used, and their design may depend to a certain extent on the actual number of levers 18 in any particular device and whether access can be gained through a bore of the freewheel device 10. As an example of a further suitable operating means for a configuration as hereinbefore described, the ring 24 may be provided with angled slots for engagement by a corresponding number of prongs located through the bore and capable of both rotation with the ring 24 and axial movements, so that axial movement of the prongs causes circumferential movement of the ring 24 independent of the driving member.

In the previously described embodiments, drive is transmitted from an inner driving member to an outer driven member, however, it will be clear that these functions may be reversed. Similarly, the parts can be arranged so that drive is transmitted in either a clockwise or counterclockwise direction.

We claim as our invention:

1. A cageless freewheel comprising a plurality of rollers interposed between inner and outer races formed respectively on a pair of driving and driven members, one of said races having wedge-shaped portions equal in number to the rollers, at least one axially extending actuating lever being interposed in the plurality of rollers and being arranged for limited circumferential movement between a first position in which the rollers assume an engaged position on rotation of the driving member so as to transmit rotation to the driven member, and a second position in which the rollers are retained in a disengaged position, and means for moving the or each lever between the said first and second positions.

2. A freewheel as claimed in claim 1, wherein the or each actuating lever has parallel sides for engagement with adjacent rollers.

3. A freewheel as claimed in claim 2, wherein the or each actuating lever is arranged so that the said sides thereof contact the adjacent rollers at approximately a pitch circle diameter of the set of rollers.

4. A freewheel as claimed in claim 2, wherein a width of the or each actuating lever between said parallel sides thereof is approximately equal to a diameter of said rollers.

5. A freewheel as claimed in claim 1, wherein the or each actuating lever includes a circular section spindle portion rotatably mounted in an axial bore in one of the said rollers.

6. A freewheel as claimed in claim 1 including means to limit the circumferential movement of the or each actuating lever to a predetermined amount.

7. A freewheel as claimed in claim 6, wherein said limiting means comprise a tongue portion formed on the or each actuating lever for location in a mating slot formed in the member having the wedge-shaped race, said slot being of greater width than a width of the tongue so as to permit the circumferential movement of the or each lever, and to limit such movement to the predetermined amount by contact of the surfaces of the tongue with adjacent surfaces of the slot.

8. A freewheel as claimed in claim 1, wherein said means for moving the or each actuating lever includes an axial extension formed at one end of the lever and arranged to co-operate during operation with an operating means.

9. A freewheel as claimed in claim 8, wherein two or more levers are interposed in the roller set.

10. A freewheel as claimed in claim 9, wherein the extensions on said actuating levers are interconnected.

11. A freewheel as claimed in claim 10, wherein the extensions are interconnected by a ring member formed integral with the actuating levers.

12. A freewheel as claimed in claim 11, wherein an outer edge of said ring is provided with at least one cam surface arranged to co-operate, during operation, with an operating means for moving the said actuating levers.

13. A freewheel as claimed in claim 12, wherein said operating means includes, for each cam surface on the ring, an axially movable prong having an end portion shaped to co-operate with the cam surface on the ring.

14. A freewheel as claimed in claim 13, wherein the or each prong is fixedly attached to a housing located on axial splines formed on an extension of the member having the wedge-shaped race so that, during operation, said housing rotates with that member and is capable of axial movements relative thereto.

15. A freewheel as claimed in claim 14, wherein said rotatable housing carries a bearing that supports a stationary housing, said stationary housing having two diametrically opposed pins extending radially therefrom, the pins being engaged in slotted ends of a lever arranged to straddle the stationary housing, said lever being connected to an actuator arranged so as to swing the lever about a fixed axis located generally perpendicular to an axis of the freewheel so as to move the slotted ends of the lever axially with respect to the freewheel.

16. A freewheel as claimed in claim 15, wherein the actuator is electrically operated.

* * * * *